United States Patent [19]

Picco

[11] Patent Number: 5,299,243
[45] Date of Patent: Mar. 29, 1994

[54] GLOVE HOLDER UNIT FOR A CONFINEMENT ENCLOSURE

[75] Inventor: Bernard Picco, Pujaut, France

[73] Assignee: Cogema-Compagnie Generale Des Matieres Nucleaires, France

[21] Appl. No.: 994,322

[22] Filed: Dec. 21, 1992

[30] Foreign Application Priority Data

Dec. 24, 1991 [FR] France ............... 91 16107

[51] Int. Cl.⁵ .................................. G21F 7/04
[52] U.S. Cl. ............................ 376/287; 2/270; 250/516.1; 312/1; 414/8; 976/DIG. 363
[58] Field of Search ............. 376/287, 260; 976/DIG. 361, DIG. 362, DIG. 363; 312/1; 2/270, 269; 250/516.1, 519.1; 414/8

[56] References Cited

U.S. PATENT DOCUMENTS

| 3,009,164 | 11/1961 | Frey | 312/1 |
| 3,051,963 | 9/1962 | Hallett | 2/270 |
| 3,811,132 | 5/1974 | Segonzac et al. | 2/270 |
| 4,123,123 | 10/1978 | Sato et al. | 312/1 |
| 4,141,609 | 2/1979 | Eisert | 312/1 |
| 4,156,146 | 5/1979 | Imai et al. | 250/516.1 |

FOREIGN PATENT DOCUMENTS 1291660 3/1962 France .
2195510 3/1974 France .
2500355 8/1982 France .

Primary Examiner—Daniel D. Wasil
Attorney, Agent, or Firm—Pearne, Gordon, McCoy & Granger

[57] ABSTRACT

The invention relates to a glove holder unit for a confinement enclosure.

The aim of the invention is to produce a unit making it possible to easily change a protective glove for the hand.

This aim is achieved with the aid of a glove holder unit having a sleeve (11), for protecting the arm and the forearm, assembled to a working glove (15), protecting the hand, and placed in an enclosure. The glove holder unit comprises means (49) for locking an assembly means (17) of the glove (15) and the protective sleeve (11). The locking means (49) being mobile between a locked position, in which they maintain the assembly means (17) and the glove (15) outside the enclosure (1) and an unlocked position in which they allow the passage of the glove (15) and its assembly means (17) between the interior and the exterior of the enclosure.

15 Claims, 6 Drawing Sheets

GLOVE HOLDER UNIT FOR A CONFINEMENT ENCLOSURE

BACKGROUND OF THE INVENTION

The invention relates to a glove holder unit for a confinement enclosure, better known under the name glove box.

A confinement enclosure is a chamber having tight, rigid walls and generally having a transparent glass plate making it possible to see from the outside into the enclosure. The enclosure is provided with several orifices in each of which is fixed a glove. Technicians using this confinement enclosure make use of these gloves in order to work within the enclosure and for manipulating various toxic or radioactive products. Consequently, it is essential that such enclosures are tight in order to prevent any pollution to the outside. Once the gloves have become worn, they have to be replaced while still maintaining the seal of the enclosure.

The conventionally used gloves are in one piece and have a length of approximately 70 to 80 cm covering the hand, forearm and part of the arm of the user. These gloves and in particular the part protecting the hand very rapidly become worn and have a very limited life, because they are used in a nitric and/or a radioactive medium.

The replacement of these gloves creates a significant quantity of waste. For illustration only, knowing that a glove has a total weight of approximately 250 g and that on average 500 gloves are used every year in a production unit, there is a waste weight of approximately 125 kg.

In addition, it is expensive to replace these gloves, because it is necessary to change the entire glove, whereas only the end part protecting the hand is generally damaged or worn.

Moreover, it would be of interest to use gloves in two parts, with a first part protecting the arm and a second part only protecting the hand. The second part could be made from different materials and have a thickness, a strength, a shape and dimensions differing as a function of the applications or users for which it is intended. Thus, the user could work with hand protecting gloves of extreme thinness, like the gloves used by surgeons for precise and difficult handling operations, while using thick gloves for manipulations requiring a special protection, but where no adroitness is required. At present this is difficult to put into practice, because it is often necessary to replace the entire glove.

In order to solve the problem of waste and the replacement of worn gloves, U.S. Pat. No. 4,141,609 discloses a glove holder unit comprising a sleeve for protecting the arm and the forearm, which is equipped with bellows and a hand protecting glove, said glove being fitted to the protective sleeve by detachable fixing means. Each detachable glove is fixed to a glove ring or disk cooperating with a ring provided at the end of the bellows-equipped protective sleeve. During the changing of the hand protecting glove, it is necessary to use a special tool for unlocking and separating the glove disk from the end of the bellows-equipped sleeve, in order to introduce a replacement glove also having a glove disk. This device is complex to use and as a result of the need of employing glove disks, the quantity of waste is increased. Moreover, the bellows-equipped sleeve is rigid and limits the movements of the user's arm and forearm.

The invention therefore aims at obviating the aforementioned disadvantages.

SUMMARY OF THE INVENTION

The invention therefore relates to a glove holder unit for a confinement enclosure, which has at least one access opening to which is fixed a glove disk, the glove holder unit having a sleeve for protecting the arm and the forearm fixed to said glove disk and a working glove protecting the hand and is equipped with means for assembling with said protective sleeve.

According to features of the invention, the protective sleeve is in at least two parts, a first part provided with bellows and a second part made from a flexible material and which can fold or bend within said first part and the glove holder unit according to the invention has means for locking the assembly means of the glove and the protective sleeve, said locking means being mobile between a locked position in which they maintain the assembly means and the glove outside the enclosure and an unlocked position in which they allow the passage of the glove and its assembly means between the interior and exterior of the enclosure.

Advantageously, the means for assembling the glove and the protective sleeve incorporates a glove holder bracelet provided at the end of said sleeve is and able to cooperate with an O-ring provided on the glove and the locking means has at least two elements which can be assembled to one another around the enclosure glove disk, each of the said elements having a circular arc-shaped shoulder able to receive at least a part of said glove holder bracelet and lock the same when said elements are assembled in the locked position.

Thus, the locking means makes it possible to maintain the glove outside the enclosure without the user having to hold it and without the glove being sucked into the interior of the enclosure as a result of the vacuum prevailing therein. The glove disk is correctly positioned facing the user and the latter can easily fit the second replacement glove around the first.

Preferably, the first part provided with the bellows of the protective sleeve ensures the protection of the arm and the second part of said sleeve made from flexible material protects the user's forearm and elbow.

Thus, as a result of these characteristics according to the invention, the movements of the user are facilitated, because he can much more easily bend the elbow. Moreover, the glove holder unit according to the invention has means for closing the first part of the sleeve making it possible to insulate said first part from the interior of the enclosure and maintain the second part of the sleeve within the first part.

The second flexible material part can be bent within the first bellows-equipped part, which was not the case in U.S. Pat. No. 4,141,609, as a result of the rigidity of the material used for producing the entire protective sleeve. Thus, the sealing means makes it possible when the user takes the protective glove from the hand outside the enclosure, to prevent the flexible part of the sleeve from being sucked into the interior of the enclosure, due to the vacuum prevailing therein. Thus, said flexible part does not accidentally come into contact with a heat source or an aggressive or corrosive product located within the enclosure.

Advantageously, the closing or sealing means comprise a ring placed on the protective sleeve, at the junction between the first bellows-equipped part and the second flexible part and a plug equipped with fixing means on the said ring. Advantageously, the fixing means is a tap and the ring is threaded on its outer surface.

As a result of this arrangement, the rigid bellows-equipped part remains within the enclosure, while the flexible part can easily bend at the connection to the sealing ring to be brought into the interior of said bellows.

BRIEF DESCRIPTION OF THE DRAWINGS

The invention is described in greater detail hereinafter relative to a non-limitative embodiment and with reference to the attached drawings, wherein show.

DETAILED DESCRIPTION OF THE PREFERRED EMBODIMENTS

Figure 1:
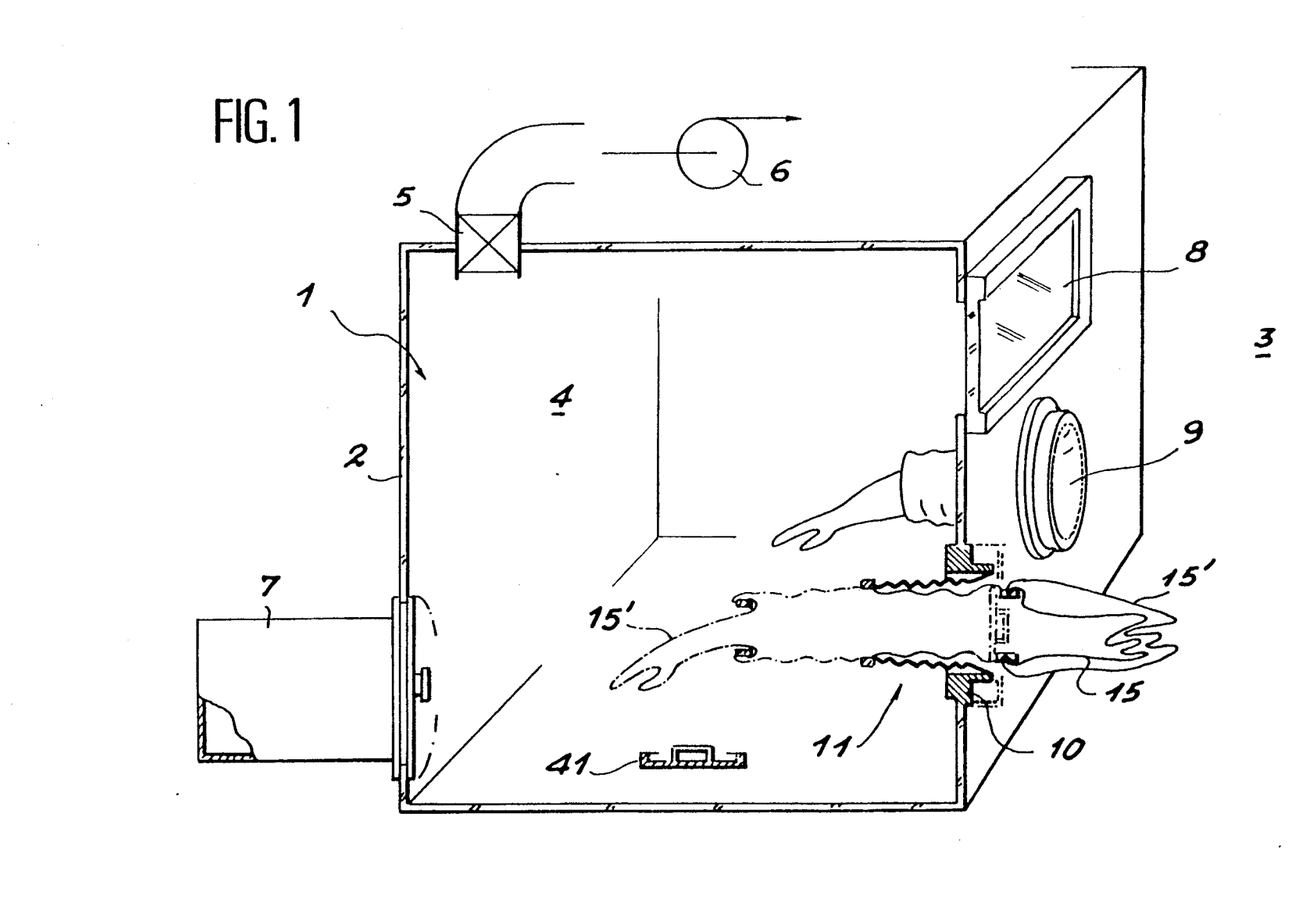
FIG. 1 A diagram illustrating in perspective a confinement enclosure equipped with the glove holder unit according to the invention.

As illustrated in FIG. 1, the glove holder unit according to the invention equips a confinement enclosure 1 having walls 2 separating the enclosure exterior 3 from the interior 4. In conventional manner, said enclosure 1 also has a filter 5, a pump 6 ensuring a vacuum within said enclosure and a transfer box 7 making it possible to insert or remove tools or products with respect to the interior of the enclosure 1. One of the enclosure walls 2 also has a transparent window 8 enabling the user to look into the interior of the enclosure 1.

Figure 4:
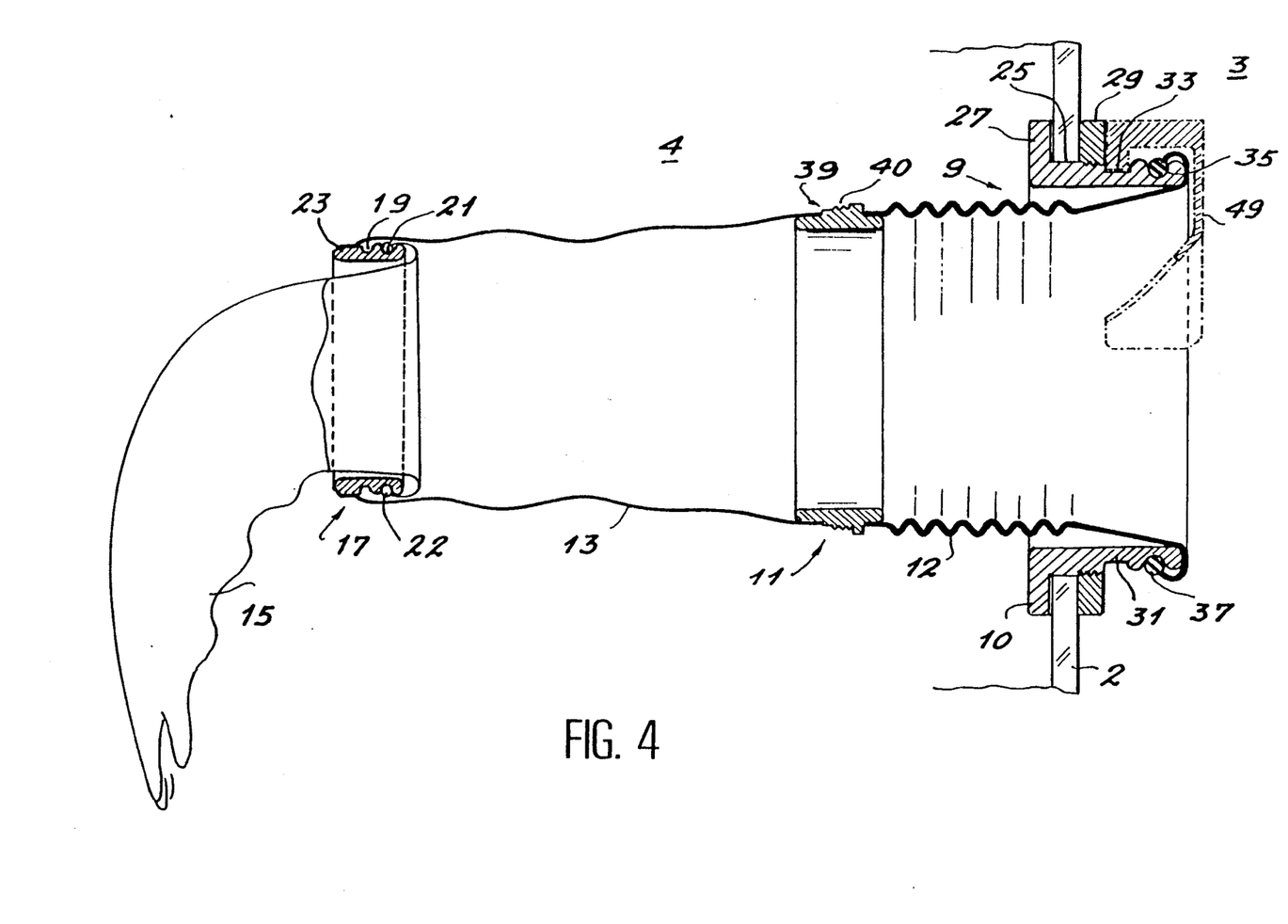
FIG. 4 A sectional view of the glove holder unit according to the invention, when the forearm protective sleeve is unfolded.

As illustrated in FIG. 4, the wall 2 has at least one access opening 9 (generally there are two for the user's two arms), said opening preferably being circular. A glove disk or ring 10 is fixed at said wall opening 9. A sleeve 11 for protecting the arm and the forearm, as well as a glove protecting the hand are fixed in detachable manner to said glove disk 10.

The protective sleeve 11 comprises a first part 12 equipped with bellows and a second part 13 made from a flexible material. In addition, a working glove 15 is fixed by detachable assembly means 17 to the second part 13 of the protective sleeve.

More specifically, the first part 12 equipped with bellows makes it possible to protect the arm, while the flexible part 13 protects the forearm and the elbow. This facilitates the movements of the user. The respective lengths of said two parts 12, 13 correspond to the average dimensions of the arm of a user.

Advantageously, the rigid, bellows-equipped part 12 is made from semi rigid synthetic rubber and the flexible part 13 is made from vinyl. However, it is also possible to choose other materials provided that they comply with the requisite rigidity and flexibility criteria and have a resistance to oxidation and/or radiolysis phenomena and/or strong aciss.

The assembly means 17 of the glove 15 and the sleeve 11 comprises a glove holder bracelet fixed to the end of the flexible part 13 of the sleeve and able to receive the glove 15. The glove holder bracelet 17 is constituted by a ring or a cylindrical tube portion having on its outer surface two substantially, annular grooves 19 and 21, the groove 19 being located substantially parallel in the center of said bracelet. These grooves 19, 21 make it possible to receive an O-ring 22 integral with the end of the glove 15. Moreover, said glove holder bracelet 17 has at its end opposite to that with the groove 21, a truncated coneshaped part 23 to which is fixed the end of the sleeve part 13. Said fixing can take place by bonding or heat sealing. The fixing is such that the glove holder bracelet 17 is located within the flexible part 13 of the sleeve.

The glove disk 10 also has a cylindrical tubular shape. It has a peripheral, annular rib 25 defined by two annular ledges or rims 27, 29. The rim 27 is placed in the interior 4 of the confinement enclosure 1, while the rim 29 is placed on the exterior 3 of the enclosure. The rib 25 receives the edges of the wall 2 forming the opening 9. The glove disk 10 also has a lateral flange 31 extending towards the outside of the enclosure perpendicular to the wall 2. This annular, lateral flange 31 also has on its outer periphery two annular grooves 33, 35 respectively. The groove 33 is located between the groove 35 and the rib 25. The groove 35 receives the O-ring 37 forming the end of the bellows-equipped sleeve 12 and thus ensures the detachable fixing of said sleeve.

Figure 7:
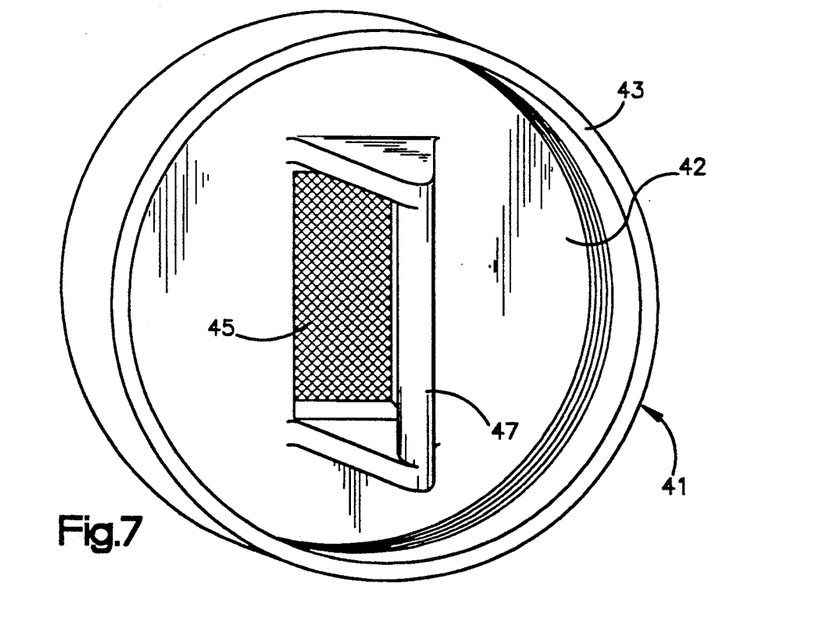
FIG. 7 A perspective view of the sealing means for the glove holder unit according to the invention.

Means 39 for sealing the first sleeve part 12 is provided and positioned at the junction between the two protective sleeve parts 12 and 13. More specifically, said sealing means 39 comprises a ring which is threaded on its outer surface and fixed by bonding or heat sealing respectively to the free end of the bellows-equipped sleeve 12 and the free end of the flexible part 13. The thread is designated 40. This ring 39 is able to cooperate with a sealing or closing plug 41 shown in FIG. 7 and which will now be described in greater detail. This plug 41 is constituted by a disk or base 42 made from a plastic material and having a tapped, peripheral, annular rim 43 so that it can be screwed onto the thread 40 of the ring 39. The tap of the plug 41 constitutes an example of fixing means to the ring 39. However, it is obvious that other fixing means such as bayonet fixing means, a catch or force assembly can be used without passing outside the scope of the invention. In addition, said plug 41 is provided substantially in its center with an aerating grid or grating 45. It also has a gripping handle 47 fixed to the plug base 42 on either side of the grid 45. When the plug 41 is in place on the ring 39, said grid 45 ensures the vacuum within the bellows 12.

The glove holder unit according to the invention also has means for locking the assembly means 17 of the glove 15 and the sleeve 11. These locking means is more particularly illustrated in FIGS. 5 and 6 and carries the general reference numeral 49. The locking means 49 preferably has two substantially identical, symmetrical elements, but there can also be more than two elements. The upper element (relative to FIG. 6 and the normal use direction), carries the reference numeral 51 and the lower element the reference numeral 53. The elements 51, 53 are placed on the lateral flange 31 of the glove disk 10 so as to cover the latter. More specifically, each element 51, 53 is shaped like a semicircularly curved channel with a substantially C-shaped section, as can best be gathered from FIG. 5. This channel is positioned "astride" on at least one part of the lateral flange 31 of the glove disk. Therefore each element 51, 53 comprises a lateral, peripheral edge 55 terminated by an element forming a gasket 57 for engaging in the groove 33 of the glove disk 10. This edge or rim 55 is extended towards its center by a front face 59 and by a slightly oblique portion 63. The latter is internally extended by a circular arc-shaped shoulder 65 for receiving the truncated cone-shaped part 23 of the glove holder bracelet 17. Moreover, said two elements 51, 53 are provided internally, level with their central opening 67, with four return-preventing strips 69 made from a thick, flexible plastic material (cf. FIG. 6). These strips 69 prevent the glove 15 from being sucked into the interior of the bellows-equipped protective part 12.

Figure 5:
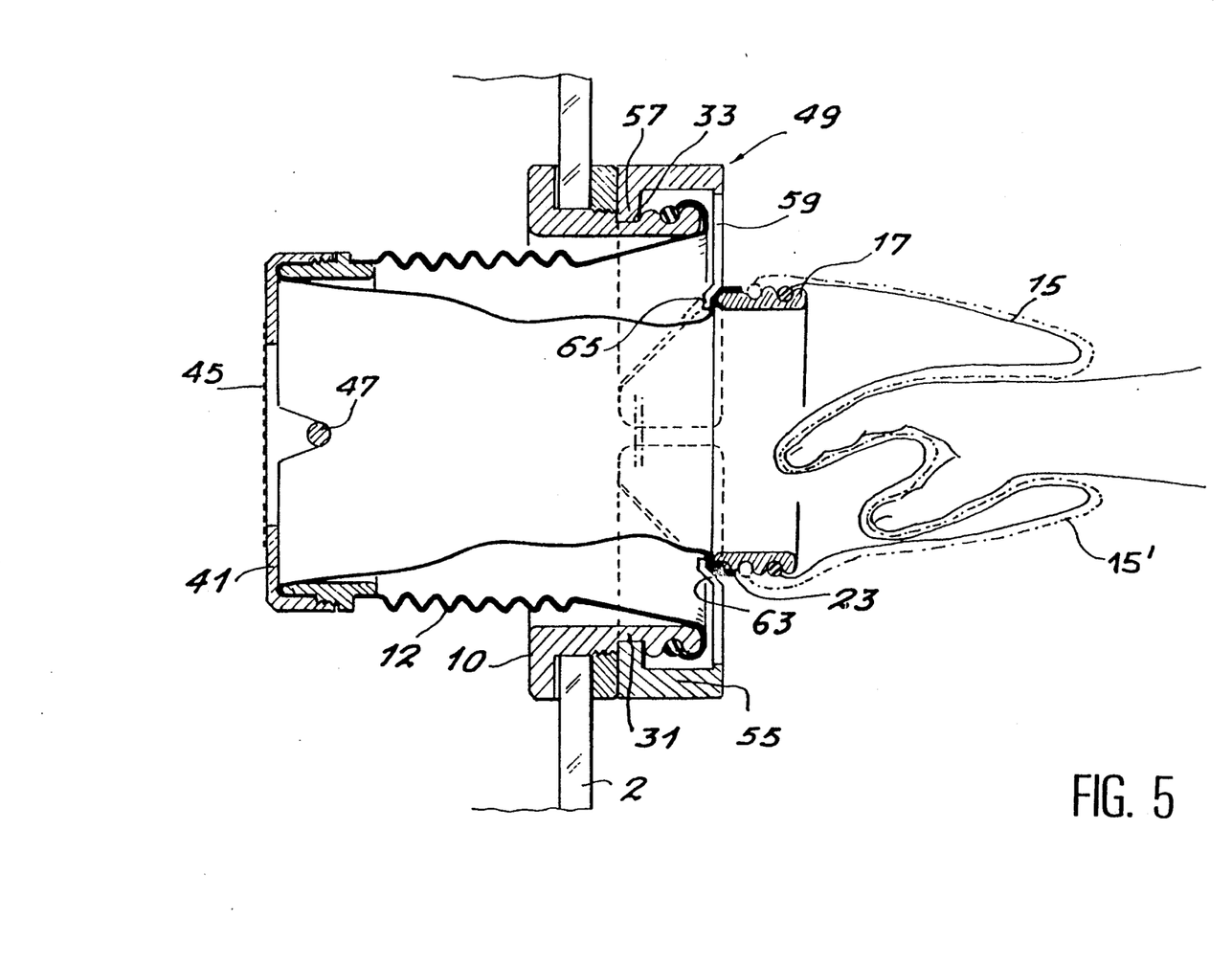
FIG. 5 A sectional view of the glove holder unit according to the invention, when the glove is outside the enclosure.
Figure 6:
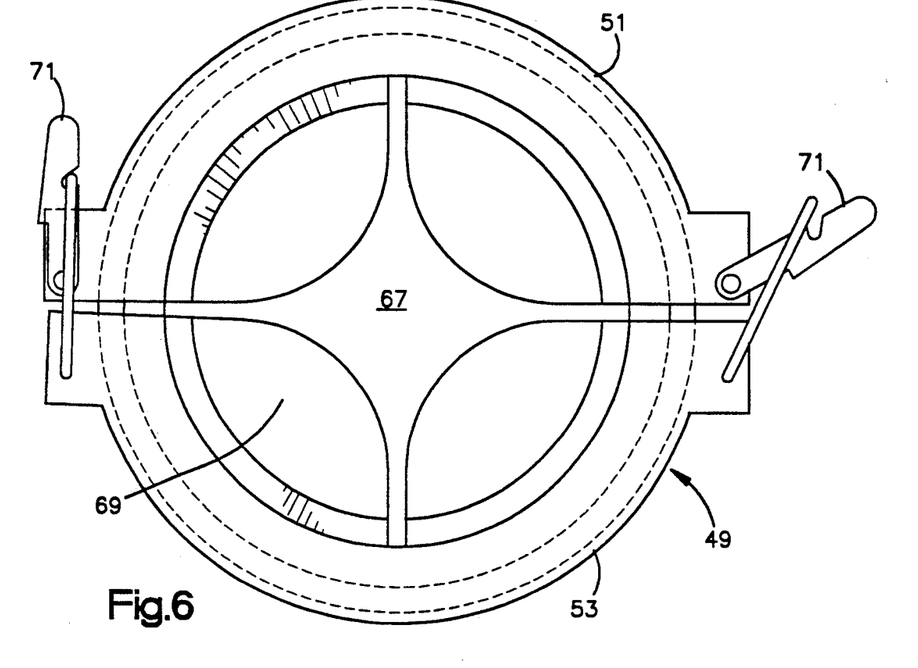
FIG. 6 A front view of the locking means for the glove holder unit according to the invention.

The locking means 49 can occupy two positions, a first locked position in which the two elements 51, 53 are locked by means 71 and a second unlocked position, in which these two elements are spaced apart from one another and permit the passage of the glove disk 17 and the glove 15.

The locking means 71 constituted by two spring hooks provided on either side of the two elements 51 and 53. In the locked position, the two elements 51 and 53 are engaged against one another (left-hand part of FIG. 6) and in the unlocked position, the lower element 53 is slightly spaced from the upper element 51 (right-hand part of FIG. 6).

Figure 2A:
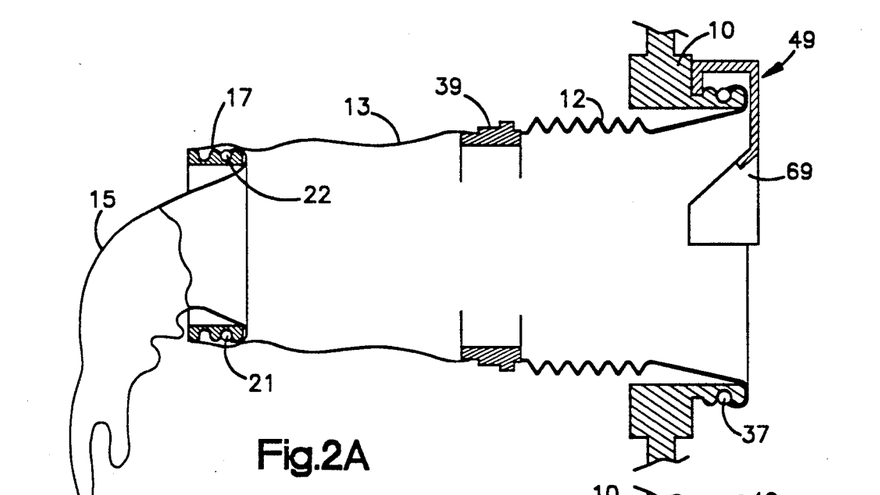
FIGS. 2 and 3 Diagrammatically a series of stages 2A, 2B, 2C and 3A, 3B, 3C relating to the use of the glove holder unit according to the invention.

The operation of the device will now be described in greater detail relative to FIGS. 2A to 3C. FIG. 2A illustrates the glove holder unit in the inoperative position, i.e. when the user's hand and arm are not in the interior. It should be noted that the locking means 49 is only partly shown.

Figure 2B:
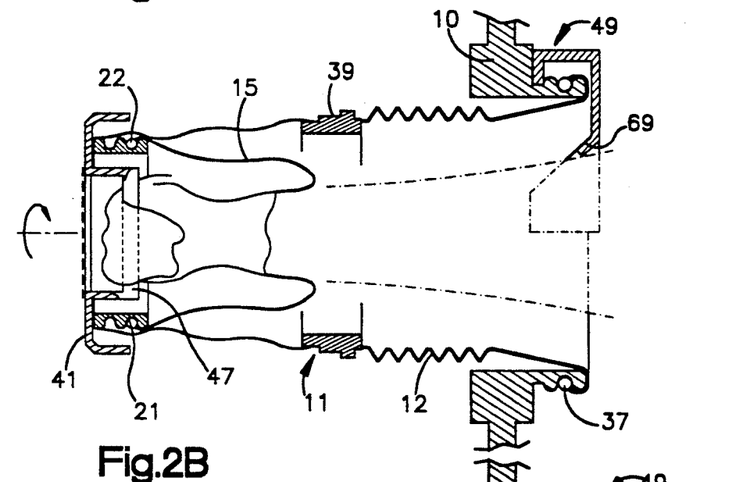
Figure 2C:
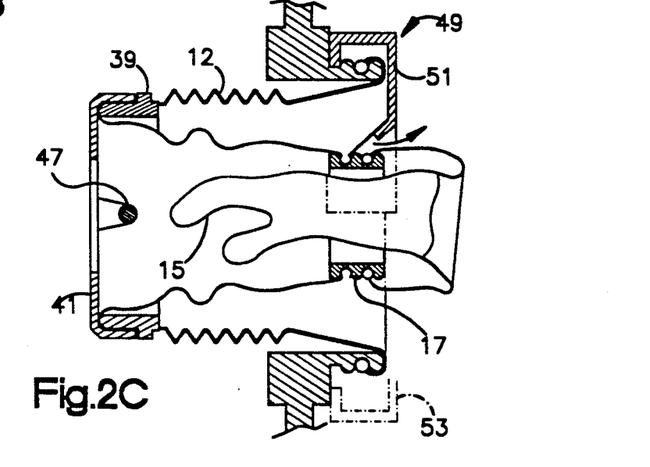

When the user wishes to change the glove 15, whose O-ring 22 is positioned in the annular groove 21, he introduces his hand and arm into the glove holder unit in the manner shown in FIG. 2B and seizes the sealing plug 41 by means of its gripping handle 47. He withdraws his hand and arm into the protective sleeve 11 until the plug 41 is level with the ring 39 and then screws the plug onto said ring by a quarter turn rotation. He is then in the position illustrated in FIG. 2C. Then, he continues to withdraw his hand and the glove 15 until the latter is outside the enclosure and turns over the glove 15 in the manner illustrated in FIG. 3A. In order to do this, it is obviously necessary for the locking means 49 to be unlocked (bottom position of the element 53 illustrated in FIG. 2C). Then, using his other hand, he locks the locking means 49 and the ring 17 consequently rests on the shoulder 65 of the locking means 49. He is then able to slip over the worn glove 15, which is inside out, a new glove 15', which is also inside out and whose O-ring 22' is located in the annular groove 19 FIG. 3A. He then inserts his hand in the new glove 15' and seizes the worn glove 15, removes the O-ring 22 of the glove 15 from the annular groove 21 and drops the worn glove 15 into the glove holder unit.

Figure 3A:
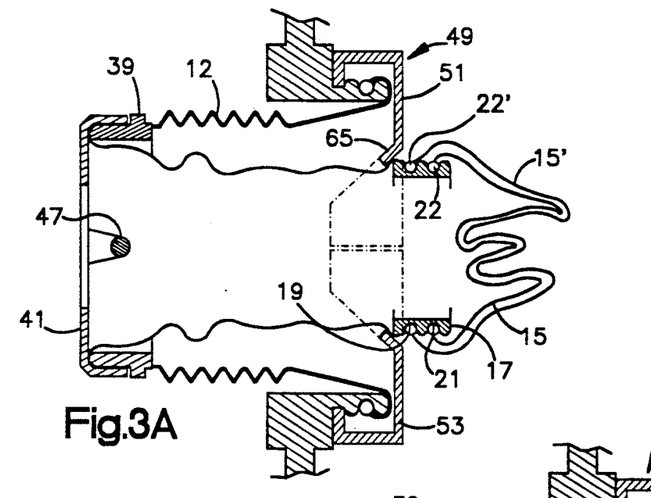
Figure 3B:
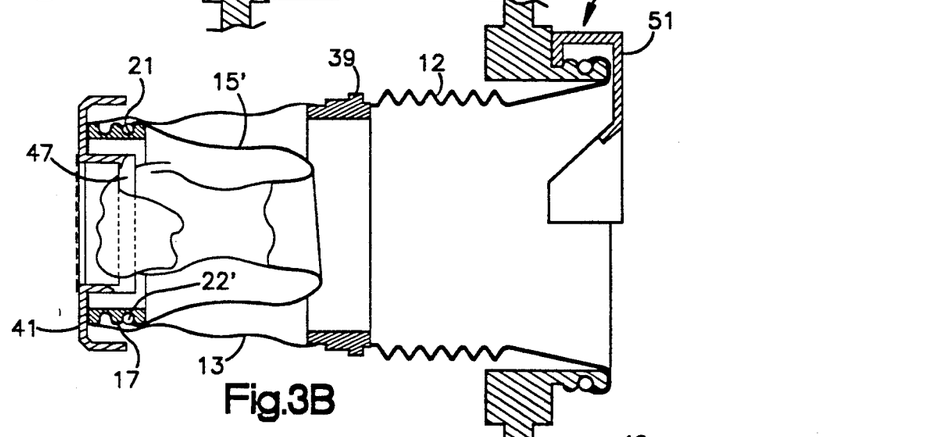
Figure 3C:
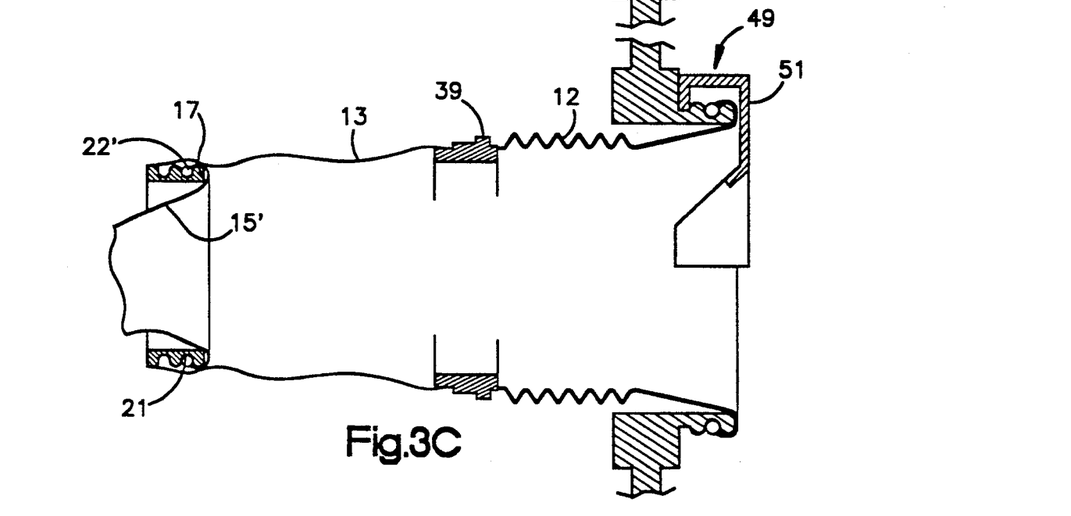

The O-ring 22' of the new glove 15' is then moved from the annular groove 19 into the annular groove 21, while maintaining maximum contact with the glove holder bracelet 17.

In order to bring about maximum sealing and security, at least one turn of the not shown adhesive tape is placed at the annular groove 21 in which is placed the O-ring 22'. Then, as illustrated in FIG. 3B, he again inserts his hand in the glove 15', so as to put it into place within the bellows 11.

He can then unlock the plug 41 by rotating the latter and place it within the enclosure. He is then in the situation shown in FIG. 3C, where his hand is protected by the glove 15'.

I claim:

1. Glove holder unit for a confinement enclosure (1), said enclosure having at least one access opening (9) on which is fixed a glove disk (10), the glove holder unit having a sleeve (11) for protecting the arm and forearm fixed to said glove disk (10) and a working glove (15) protecting the hand and provided with means (17) for the detachable assembly with said protective sleeve (11), wherein the protective sleeve (11) comprises at least two parts, a first part (12) provided with bellows and a second part (13) made from a flexible material, the latter part (13) being able to bend within the first part (12), the glove holder unit further comprising means (49) for locking the assembly means (17) of the glove (15) and the protective sleeve (11), said locking means (49) being mobile between a locked position in which it maintains the assembly means (17) and the glove (15) outside the enclosure (1) and an unlocked position in which it allows the passage of the glove (15) and its assembly means (17) between the interior and exterior of the enclosure.

2. Glove holder unit according to claim 1, wherein the assembly means (17) of the glove (15) and the protective sleeve (11) comprises a glove holder bracelet provided at the end of said sleeve and is able to cooperate with an O-ring (22) provided on said glove and in that the locking means (49) incorporates at least two elements (51, 53) which can be assembled with one another about a glove disk (10) of the enclosure, each of these elements (51, 53) having a circular arc-shaped shoulder (65) able to receive at least one part of said glove holder bracelet (17) and lock the latter when the elements (51, 53) are assembled in the locked position.

3. Glove holder unit according to claim 2, wherein the locking means (49) comprises at least one return-preventing strip (69) which prevents the return of the glove (15) to the interior of the enclosure (1) when positioned outside the same.

4. Glove holder unit according to claim 2, wherein the glove holder bracelet (17) is externally provided with two substantially parallel, annular grooves (19, 21) able to receive the O-ring (22) provided on the glove (15).

5. Glove holder unit according to claim 2, wherein the glove disk (10) comprises a lateral flange (31) and the locking means (49) comprises at least two elements (51, 53) shaped like a semicircularly curved channel, each channel being positioned astride at least one part of the lateral flange (31).

6. Glove holder unit according to any one of the preceding claims, further comprising means (39) for sealing the first part of the sleeve (12), said sealing means (39) making it possible to insulate said first part from the interior of the enclosure (4) and maintain the second part (13) of the sleeve within said first part.

7. Glove holder unit according to claim 6, wherein the sealing means (39) comprises a ring located on the protective sleeve (11) at a junction between the first bellows-equipped part (12) and the second flexible part (13) and a sealing plug (41) provided with means for fixing said sealing plug to said ring.

8. Glove holder unit according to claim 7, wherein the fixing means comprises a tap and the outer surface of the ring (39) is threaded to mate with said tap.

9. Glove holder unit according to claim 7, wherein the sealing plug (41) is provided with an aerating grid (45).

10. Glove holder unit according to claim 7, wherein the bottom of the sealing plug (41) is provided with a gripping handle (47).

11. Glove holder unit according to claim 1, wherein the first, bellows-equipped part (12) of the protective sleeve protects the arm and the second part of said sleeve (13), made from flexible material, protects the user's forearm and elbow.

12. Glove holder unit according to claim 1, wherein the first part of the protective sleeve (12) is made from rigid, synthetic rubber.

13. Glove holder unit according to claim 1, wherein the second part (13) of the protective sleeve is made from vinyl.

14. Glove holder unit according to claim 1, wherein the protective sleeve (11) is detachably fixed to said glove disk (10).

15. Glove holder unit according to claim 9, wherein the bottom of the sealing plug (41) is provided with a gripping handle (47).

* * * * *

UNITED STATES PATENT AND TRADEMARK OFFICE
CERTIFICATE OF CORRECTION

PATENT NO. : 5,299,243
DATED : March 29, 1994
INVENTOR(S) : Bernard Picco It is certified that error appears in the above-identified patent and that said Letters Patent is hereby corrected as shown below:

Column 3, line 68, delete "aciss" and insert --acids--.

Column 5, line 23, after "71" insert --is--.

Column 6, lines 33 and 34, (Claim 2, lines 5 and 6), delete "in that".

Signed and Sealed this

Twentieth Day of September, 1994

Attest:

BRUCE LEHMAN

Attesting Officer    Commissioner of Patents and Trademarks